(12) United States Patent
Su et al.

(10) Patent No.: US 11,996,772 B2
(45) Date of Patent: May 28, 2024

(54) VOLTAGE CONTROL METHOD

(71) Applicants: Szu-Chieh Su, Taoyuan (TW);
Wei-Chin Tseng, Taoyuan (TW);
Chih-Hsien Wang, Taoyuan (TW);
His-Ping Tsai, Taoyuan (TW);
Wen-Chih Chen, Taoyuan (TW);
Guei-Cheng Hu, Taoyuan (TW)

(72) Inventors: Szu-Chieh Su, Taoyuan (TW);
Wei-Chin Tseng, Taoyuan (TW);
Chih-Hsien Wang, Taoyuan (TW);
His-Ping Tsai, Taoyuan (TW);
Wen-Chih Chen, Taoyuan (TW);
Guei-Cheng Hu, Taoyuan (TW)

(73) Assignee: Chroma ATE Inc., Taoyuan (TW)

( * ) Notice: Subject to any disclaimer, the term of this patent is extended or adjusted under 35 U.S.C. 154(b) by 283 days.

(21) Appl. No.: 17/562,047

(22) Filed: Dec. 27, 2021

(65) Prior Publication Data

US 2022/0209666 A1 Jun. 30, 2022

(30) Foreign Application Priority Data

Dec. 31, 2020 (TW) ................. 109147016

(51) Int. Cl.
*H02M 3/156* (2006.01)
*H02M 3/335* (2006.01)

(52) U.S. Cl.
CPC ....... *H02M 3/156* (2013.01); *H02M 3/33507* (2013.01)

(58) Field of Classification Search
CPC ..... G05F 1/00; G05F 1/10; G05F 1/12; G05F 1/46; G05F 1/455; G05F 1/45; G05F 1/445; G05F 1/66; G05F 1/40; G05F 1/42; G05F 1/44; G05F 1/462; G05F 1/52; G05F 1/56; G05F 3/10; G05F 3/16; G05F 3/18; G05F 3/185; G05F 3/20; G05F 3/26; G05F 3/30; G05F 3/205; G05F 3/22; G05F 3/24; G05F 3/222; G05F 3/242; G05F 3/225; G05F 3/227; G05F 3/245; G05F 3/247; G05F 3/262; G05F 3/265; G05F 3/267; G05F 1/575; H02M 5/2573; H02M 1/081; H02M 5/293; H02M 7/12; H02M 3/10; H02M 3/125; H02M 3/13; H02M 3/135; H02M 3/145; H02M 3/15; H02M 3/155; H02M 3/156; H02M 3/157; H02M 3/158;

(Continued)

(56) References Cited

U.S. PATENT DOCUMENTS

| 7,728,599 | B2* | 6/2010 | Tae ........................ H02J 7/1423 324/433 |
| 8,179,114 | B2* | 5/2012 | Hirahara ............. H02M 3/1588 323/225 |
| 10,622,893 | B2* | 4/2020 | Jiang ................. H02M 3/33592 |

* cited by examiner

Primary Examiner — Jeffrey A Gblende

(57) ABSTRACT

The present invention provides a voltage control method for controlling a power supply. The voltage control method comprises the following steps: obtaining a present output voltage value associated with a present gain value; obtaining a predetermined output voltage value associated with a predetermined duty ratio; calculating a target gain value, corresponding to the predetermined duty ratio, according to a gain value formula; performing a weight calculation on the present gain value and the target gain value for generating a buffer gain value; and setting an output voltage command according to the buffer gain value. Wherein the buffer gain value is between the present gain value and the target gain value.

4 Claims, 3 Drawing Sheets

(58) Field of Classification Search
CPC .............. H02M 1/346; H02M 3/1588; H02M 2003/1566; H02M 3/1582; H02M 3/1584; H02M 2003/1557; H02M 1/0032; H02M 1/4225; H02M 7/217; H02M 1/0025; H02M 1/0045; H02M 1/0009; H05B 39/048; B23K 11/24; H04B 2215/069
See application file for complete search history.

VOLTAGE CONTROL METHOD

CROSS REFERENCE TO RELATED APPLICATION

The present application claims priority to Taiwan patent application Serial No. 109147016 filed on Dec. 31, 2020, the entire content of which is incorporated by reference to this application.

BACKGROUND OF THE INVENTION

1. Field of the Invention

The present invention pertains to a voltage control method, more specifically to a voltage control method with a gain which can be adjusted dynamically.

2. Description of the Prior Art

In order to provide a stable output voltage to a load, the traditional power supply system usually uses a feedback mechanism to monitor the output voltage. For example, it is common to make the output voltage track a reference voltage, thereby making the output voltage more controllable. Generally speaking, in order to maintain the efficiency of the output voltage with heavy loading, the traditional power supply system will choose to use a larger gain value. However, in some usage scenarios, such as light loading or floating, using the larger gain value will result in significant ripples in the low output voltage. Said ripples may cause the power supply system fail to meet customer specifications. On the contrary, if a smaller gain value is chosen to solve the ripple problem, it may have another problem of insufficient transient response when the heavy loading is suddenly applied.

Therefore, the industry needs a new voltage control method that can dynamically adjust the gain value to adapt to different load types, and have the stability of low output voltage and high transient response speed with heavy load.

SUMMARY OF THE INVENTION

The present invention provides a voltage control method that can dynamically adjust the gain value during low voltage output to improve the ripple problem, and can also increase the transient response speed when the load requires high output voltage.

The present invention provides a voltage control method for controlling a power supply. The voltage control method comprises the following steps: obtaining a present output voltage value associated with a present gain value; obtaining a predetermined output voltage value associated with a predetermined duty ratio; calculating a target gain value, corresponding to the predetermined duty ratio, according to a gain value formula; performing a weight calculation on the present gain value and the target gain value for generating a buffer gain value; and setting an output voltage command according to the buffer gain value. Wherein the buffer gain value is between the present gain value and the target gain value.

In some embodiments, in the step of calculating the target gain value, corresponding to the predetermined duty ratio, according to the gain value formula, may further comprise the following steps: determining whether the target gain value is lower than a first threshold value or higher than a second threshold value; setting the target gain value to the first threshold value when the target gain value is lower than the first threshold value; and setting the target gain value to the second threshold value when the target gain value is higher than the second threshold value. Besides, the voltage control method may further comprise the following steps: detecting an inductive current of the power supply; generating a priority command when the change of the inductive current is larger a third threshold value; and setting the output voltage command according to the second threshold value when the priority command exists.

In some embodiments, in the step of performing the weight calculation on the present gain value and the target gain value for generating the buffer gain value, may further comprise the following steps: providing a first weight value to the present gain value; and providing a second weight value to the target gain value. Wherein the first weight value may be larger than the second weight value. Besides, the buffer gain value may equal to the sum of the product of the first weight value and the present gain value and the product of the second weight value and the target gain value.

In summary, the voltage control method provided by the present invention can dynamically adjust the gain value during low voltage output, and reduce the instantaneous change of the gain value, thereby improving the ripple problem. In addition, the voltage control method of the present invention can also detect whether the power supply operates under heavy load. When the power supply operates under heavy load, the priority command can be generated to set a higher gain value to improve the transient response speed.

BRIEF DESCRIPTION OF THE APPENDED DRAWINGS

DETAILED DESCRIPTION OF THE INVENTION

The features, objections, and functions of the present invention are further disclosed below. However, it is only a few of the possible embodiments of the present invention, and the scope of the present invention is not limited thereto; that is, the equivalent changes and modifications done in accordance with the claims of the present invention will remain the subject of the present invention. Without departing from the spirit and scope of the invention, it should be considered as further enablement of the invention.

Figure 1:
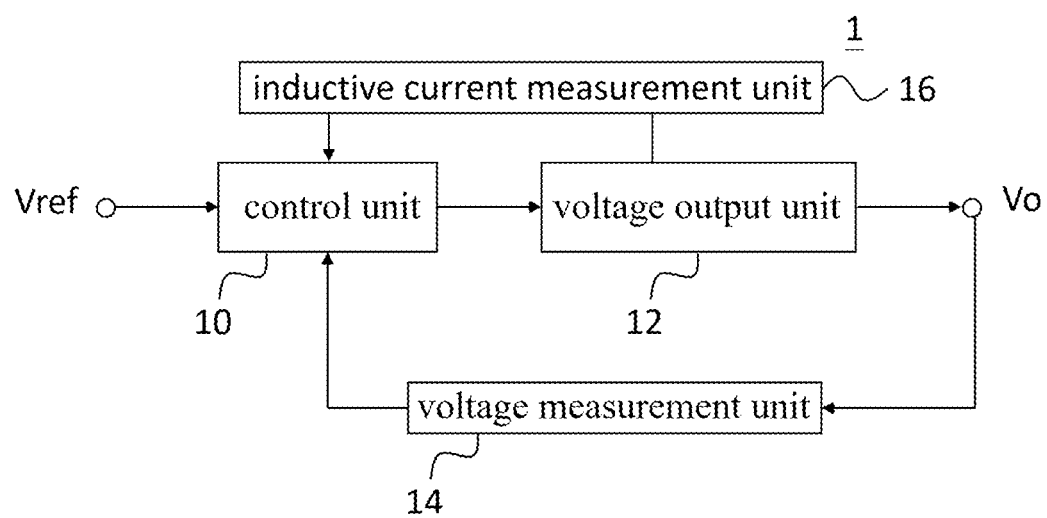
FIG. 1 is a block diagram of a power supply using a voltage control method in accordance with an embodiment of the present invention.

Please refer to FIG. 1, FIG. 1 is a block diagram of a power supply using a voltage control method in accordance with an embodiment of the present invention. As shown in FIG. 1, the voltage control method of the present invention can be applied to a power supply system, such as a power supply 1. The power supply 1 may comprise a control unit 10, a voltage output unit 12, a voltage measurement unit 14, and an inductive current measurement unit 16. Here, the control unit 10 may be electrically connected to the voltage output unit 12, the voltage measurement unit 14, and the inductive current measurement unit 16, respectively. In an example, the voltage output unit 12 may be a buck converter or other PWM voltage converter. The output stage of the voltage output unit 12 can be connected to a load (not shown). The voltage measurement unit 14 is used to measure the voltage value output by the voltage output unit 12 to the load, which can be expressed as the present output voltage value Vo. In addition, the inductive current measuring unit 16 is disposed in the voltage output unit 12 or is electrically connected to the voltage output unit 12 to measure the inductive current in the voltage output unit 12 (for example, the power level of the voltage output unit 12).

Figure 2:
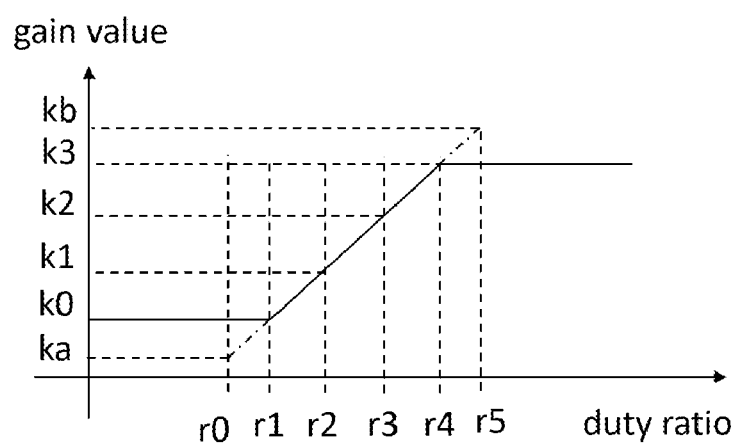
FIG. 2 is a schematic diagram of the corresponding relationship between the gain value and the duty ratio in accordance with an embodiment of the present invention.

Person having ordinary skill in the art should understand that the voltage output unit 12 can switch the duty ratio according to a control voltage of the control unit 10 to determine the output voltage. In practice, the control unit 10 can receive a predetermined output voltage value Vref from outside of the power supply 1, and obtain the present output voltage value Vo from the voltage measurement unit 14. The control voltage can be determined by the difference between the predetermined output voltage value Vref and the present output voltage value Vo. Traditionally, the loop gain of the voltage output unit does not change, but the loop gain of the voltage output unit 12 in this embodiment can be dynamically adjusted. In an example, the voltage output unit 12 may store a gain value formula, and the gain value formula may be a look-up table or a linear equation, which is not limited in this embodiment. In order to explain how the voltage output unit 12 adjusts the loop gain, please refer to FIG. 1 and FIG. 2 together. FIG. 2 is a schematic diagram of the corresponding relationship between the gain value and the duty ratio in accordance with an embodiment of the present invention. If the voltage output unit 12 has output the present output voltage value Vo at the previous time point, since the corresponding duty ratio for the voltage output unit 12 to generate the present output voltage value Vo should be known. For example, the corresponding duty ratio for the voltage output unit 12 to generate the present output voltage value Vo is r2. Based on the corresponding relationship between the gain value and the duty ratio shown in FIG. 2 (gain value formula), it can be inferred that when the duty ratio is r2, the corresponding gain value is k1 (present gain value).

Next, assuming that the voltage output unit 12 can obtain the predetermined output voltage value Vref from the control voltage at the next time point, the duty ratio (predetermined duty ratio), for example r3, corresponding to the predetermined output voltage value Vref can also be calculated. Similarly, according to the corresponding relationship between the gain value and the duty ratio (gain value formula) shown in FIG. 2, it can be inferred that when the duty ratio is r3, the corresponding gain value is k2 (target gain value). However, the voltage output unit 12 of this embodiment does not directly adjust the loop gain to k2 at the next time point. The reason is that directly changing the gain value k1 to the gain value k2 will cause the gain value change drastically, which makes the waveform of the output voltage provided by the voltage output unit 12 to be unstable and will be obvious ripple. Therefore, the voltage output unit 12 of this embodiment performs a weight calculation on the gain value k1 (present gain value) and the gain value k2 (target gain value) to generate a weighted gain value kx (buffer gain value). In an example, the voltage output unit 12 may give the gain value k1 a weight value a1 (first weight value), and give the gain value k2 another weight value a2 (second weight value). At this time, the weighted gain value kx can be expressed as the following equation (1) for the weight calculation.

$$kx=a1*k1+a2*k2 \quad (1)$$

From the above equation (1), it can be seen that the weighted gain value kx is the sum of the product of the weight value a1 (first weight value) and the gain value k1 (present gain value), and the product of the weight value a2 (second weight value) and the gain value k2 (target gain value). Assuming that the weight value a1 and the weight value a2 can be selected between 0 and 1, and the sum of the weight value a1 and the weight value a2 equals to 1, the weighted gain value kx (buffer gain value) will be between the gain value k1 (present gain value) and gain value k2 (target gain value). In practice, in order to prevent the weighted gain value kx from changing too much, the weight value a1 can be greater than the weight value a2. For example, the weight value a1 can be 0.9 and the weight value a2 can be 0.1, so that the weighted gain value kx will be closer to the gain value k1. In an example, the voltage output unit 12 sets the output voltage command based on the weighted gain value kx (buffer gain value) to generate the output voltage to be output to the load at the next time point.

It is worth mentioning that when the duty ratio is substituted into the gain value formula, the gain value may actually have upper and lower limits, which may not completely reflect the change of the duty ratio. For example, the corresponding relationship between gain and duty ratio (gain value formula) shown in FIG. 2 can be seen that if the duty ratio is less than r1, the gain value will be limited to the lower limit gain value k0 (first threshold value). Conversely, if the duty ratio is greater than r4, the gain value will be limited to the upper limit gain value k3 (second threshold value). Assuming that the voltage output unit 12 has output the present output voltage value Vo at the previous time point, and the present output voltage value Vo corresponds to the duty ratio r2 and the present gain value k1. At this time, if the voltage output unit 12 calculates that the duty ratio corresponding to the predetermined output voltage value Vref is r0, the duty ratio r0 should be calculated corresponding to the target gain value ka according to the original gain value formula. However, since the target gain value ka is lower than the lower limit gain value k0, the gain value will be directly limited to k0, that is, the voltage output unit 12 will set the target gain value to the gain value k0. Then, the weighted gain value kx can be expressed as the following equation (2) for the weight calculation.

$$kx=a1*k1+a2*k0 \quad (2)$$

Similarly, assuming that the voltage output unit 12 calculates that the duty ratio corresponding to the predetermined output voltage value Vref is r5, the duty ratio r5 corresponding to the target gain value kb should be calculated according to the original gain value formula. However, since the target gain value kb is higher than the upper limit gain value k3, the gain value will be directly limited to k3, that is, the voltage output unit 12 will set the target gain value to the gain value k3. Then, the weighted gain value kx can be expressed as the following equation (3) for the weight calculation.

$$kx=a1*k1+a2*k3 \quad (3)$$

It can be seen from the above example that the gain value formula is the corresponding relationship between the gain value and the duty ratio, which can also be seen as the slope of the inclined line in FIG. 2, and this embodiment does not limit the value of the slope here. In addition, the present embodiment does not limit the lower limit gain value or the upper limit gain value, and person having ordinary skill in the art can choose them freely. Generally speaking, the above example of using the weight calculation to obtain the weighted gain value is more suitable for applications when the power supply 1 operates under light load or no load. If the power supply 1 suddenly operates under heavy load (for example, drawing a large current), the voltage output unit 12 may no longer use the weight calculation. In practice, when the power supply 1 suddenly operates under heavy load, the inductive current measuring unit 16 will detect the change of the inductive current. For example, when the change of the inductive current is greater than the predetermined threshold (third threshold value), the signal output by the inductive current measuring unit 16 will be considered as a priority command. At this time, the voltage output unit 12 will directly give the output voltage command for setting a maximum gain value (for example, the second threshold value) based on the priority command, and generates the corresponding output voltage to the load at the next time point. In other words, when the voltage output unit 12 mentioned in this embodiment is lightly loaded or unloaded, the weighted gain value can be used to set the output voltage command to avoid the instantaneous jump and change of the gain value. On the other hand, when the voltage output unit 12 is heavily loaded, the priority command can be used to skip the weight calculation, and the output voltage command can be directly set with the maximum gain value to enhance the transient response speed.

Figure 3:
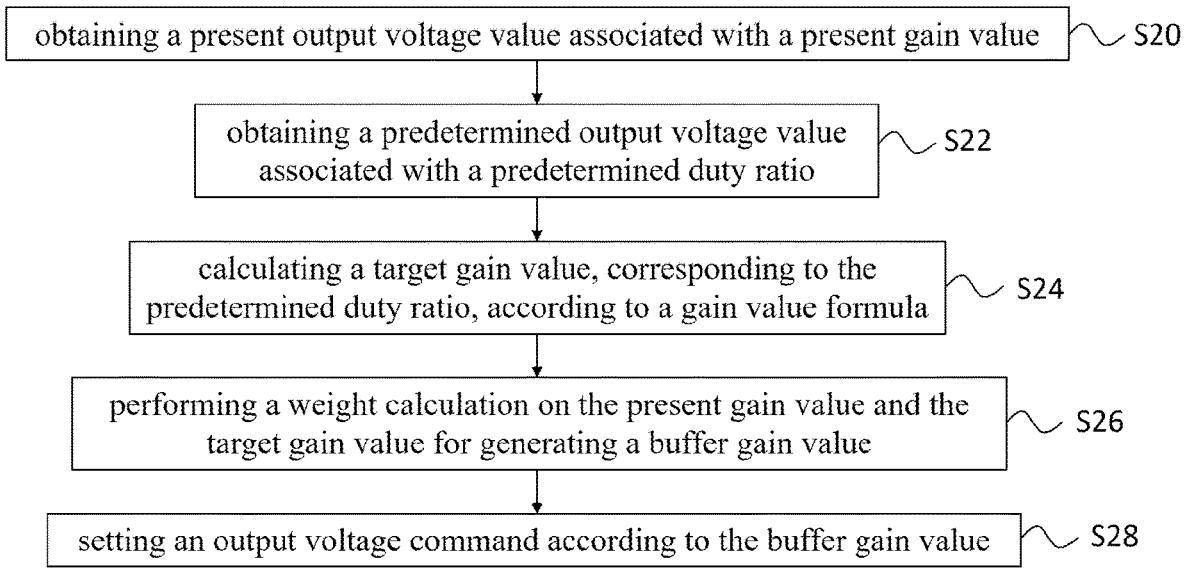
FIG. 3 is a flowchart of the voltage control method in accordance with an embodiment of the present invention.

In order to explain the voltage control method of the present invention, please refer to FIG. 1 to FIG. 3 together. FIG. 3 is a flowchart of the voltage control method in accordance with an embodiment of the present invention. As shown in the figures, in step S20, the voltage measurement unit 14 can measure the present output voltage value Vo output by the voltage output unit 12 to the load, and the present output voltage value Vo will have the corresponding gain value (present gain value) and the corresponding duty ratio. In step S22, the control unit 10 will receive a predetermined output voltage value, and the predetermined output voltage value will also have another corresponding gain value and another corresponding duty ratio (predetermined duty ratio). In step S24, the voltage output unit 12 may calculate the target gain value corresponding to the predetermined duty ratio according to the gain value formula. In step S26, the voltage output unit 12 may perform a weight calculation on the present gain value and the target gain value to generate a buffer gain value, as shown in the above equations (1) to (3). Finally, in step S28, the voltage output unit 12 sets the output voltage command according to the buffer gain value, and generates the output voltage to be output to the load at the next time point.

In summary, the voltage control method provided by the present invention can dynamically adjust the gain value during low voltage output, and reduce the instantaneous change of the gain value, thereby improving the ripple problem. In addition, the voltage control method of the present invention can also detect whether the power supply operates under heavy load. When the power supply operates under heavy load, the priority command can be generated to set a higher gain value to improve the transient response speed.

What is claimed is:

1. A voltage control method for controlling a power supply, the voltage control method comprising:
   obtaining a present output voltage value, measured by a voltage measurement unit, associated with a present gain value;
   obtaining a predetermined output voltage value, received by a control unit, associated with a predetermined duty ratio;
   calculating, by the voltage output unit, a target gain value, corresponding to the predetermined duty ratio, according to a gain value formula stored in a voltage output unit;
   performing, by the voltage output unit, a weight calculation on the present gain value and the target gain value for generating a buffer gain value; and
   setting, by the voltage output unit, an output voltage command according to the buffer gain value;
   wherein the buffer gain value is between the present gain value and the target gain value,
   wherein the gain value formula indicates a corresponding relationship between each gain value and each duty ratio,
   wherein the weight calculation multiplies a first weight value, stored in the voltage output unit, to the present gain value and multiplies a second weight value, stored in the voltage output unit, to the target gain value, and the buffer gain value equals to a sum of a product of the first weight value and the present gain value and a product of the second weight value and the target gain value.

2. The voltage control method according to claim 1, in a step of calculating the target gain value, corresponding to the predetermined duty ratio, according to the gain value formula, further comprising:
   determining whether the target gain value is lower than a first threshold value or higher than a second threshold value;
   setting the target gain value to the first threshold value when the target gain value is lower than the first threshold value; and
   setting the target gain value to the second threshold value when the target gain value is higher than the second threshold value.

3. The voltage control method according to claim 2, further comprising:
   detecting an inductive current of the power supply;
   generating a priority command when the change of the inductive current is larger a third threshold value; and
   setting the output voltage command according to the second threshold value according to the priority command.

4. The voltage control method according to claim 1, wherein the first weight value is larger than the second weight value.

* * * * *